Dec. 6, 1932.  W. G. HULT ET AL  1,890,153
CLUTCH BRAKE CONTROL DEVICE FOR MOTOR VEHICLES
Filed Dec. 26, 1931  3 Sheets-Sheet 3
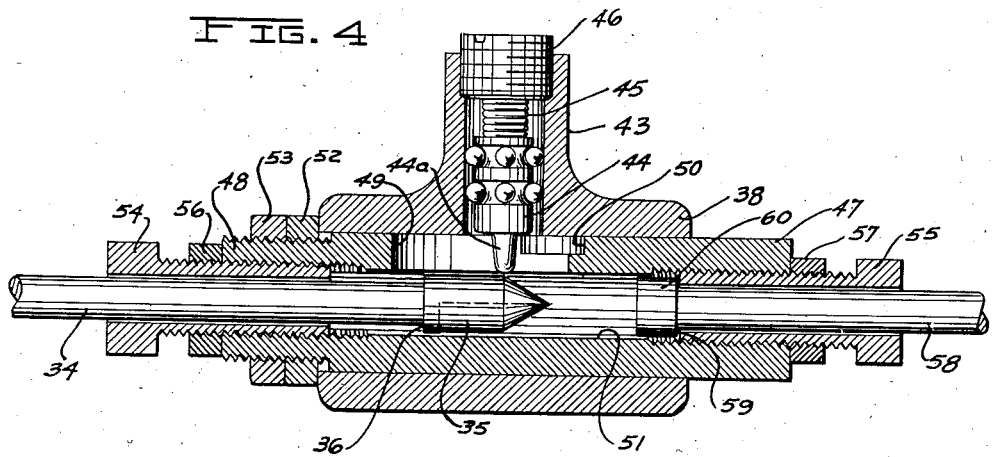
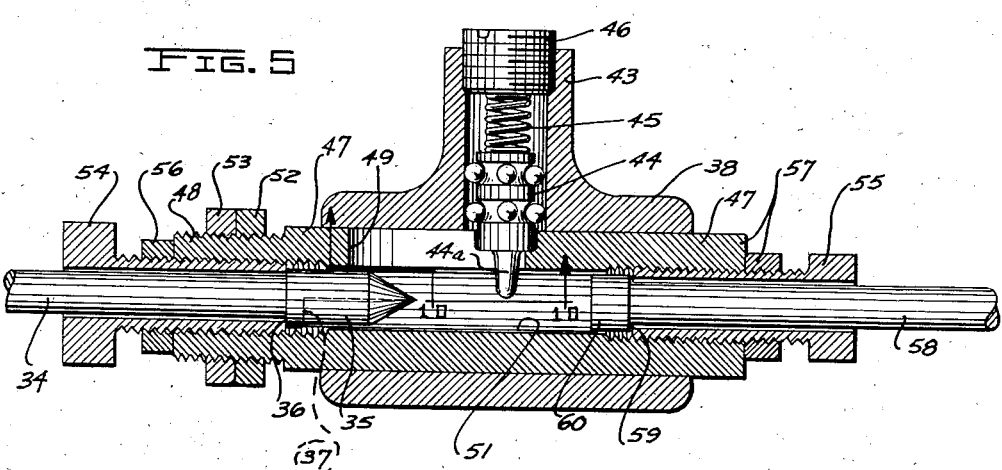
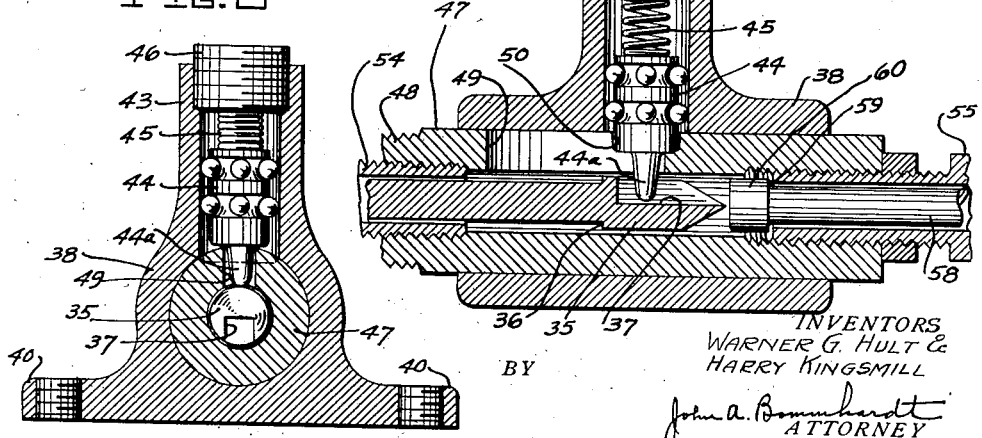
INVENTORS
WARNER G. HULT &
HARRY KINGSMILL
BY
John A. Bornhardt
ATTORNEY Patented Dec. 6, 1932

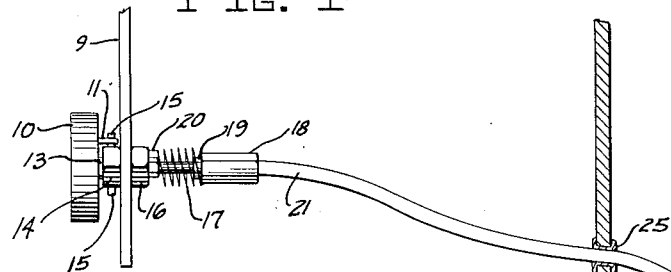
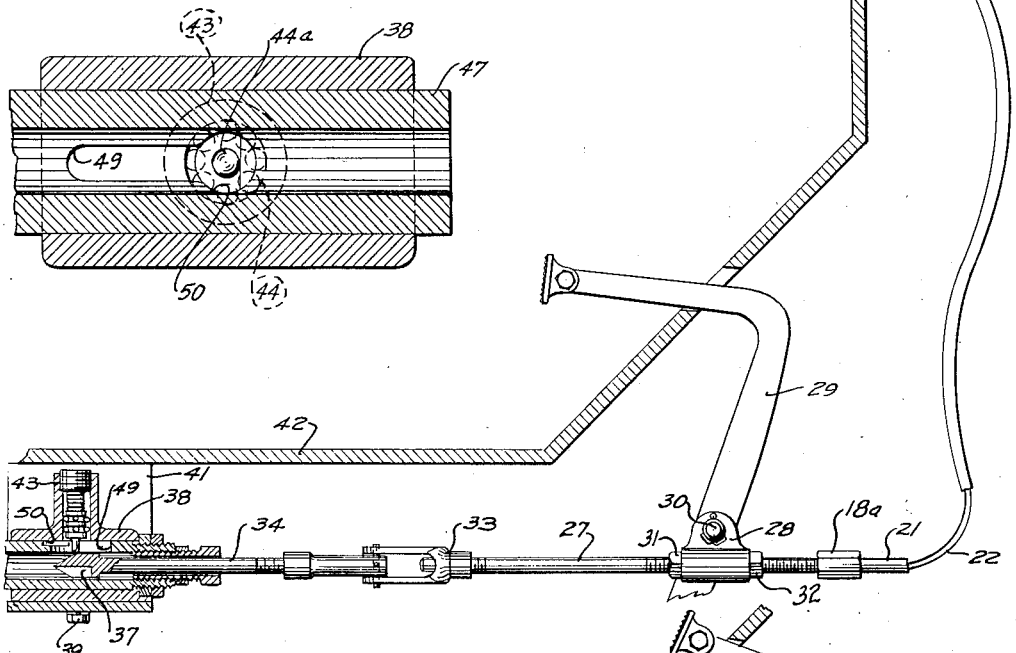
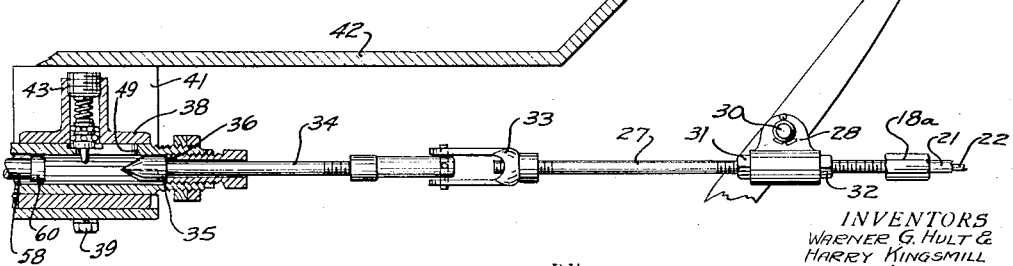

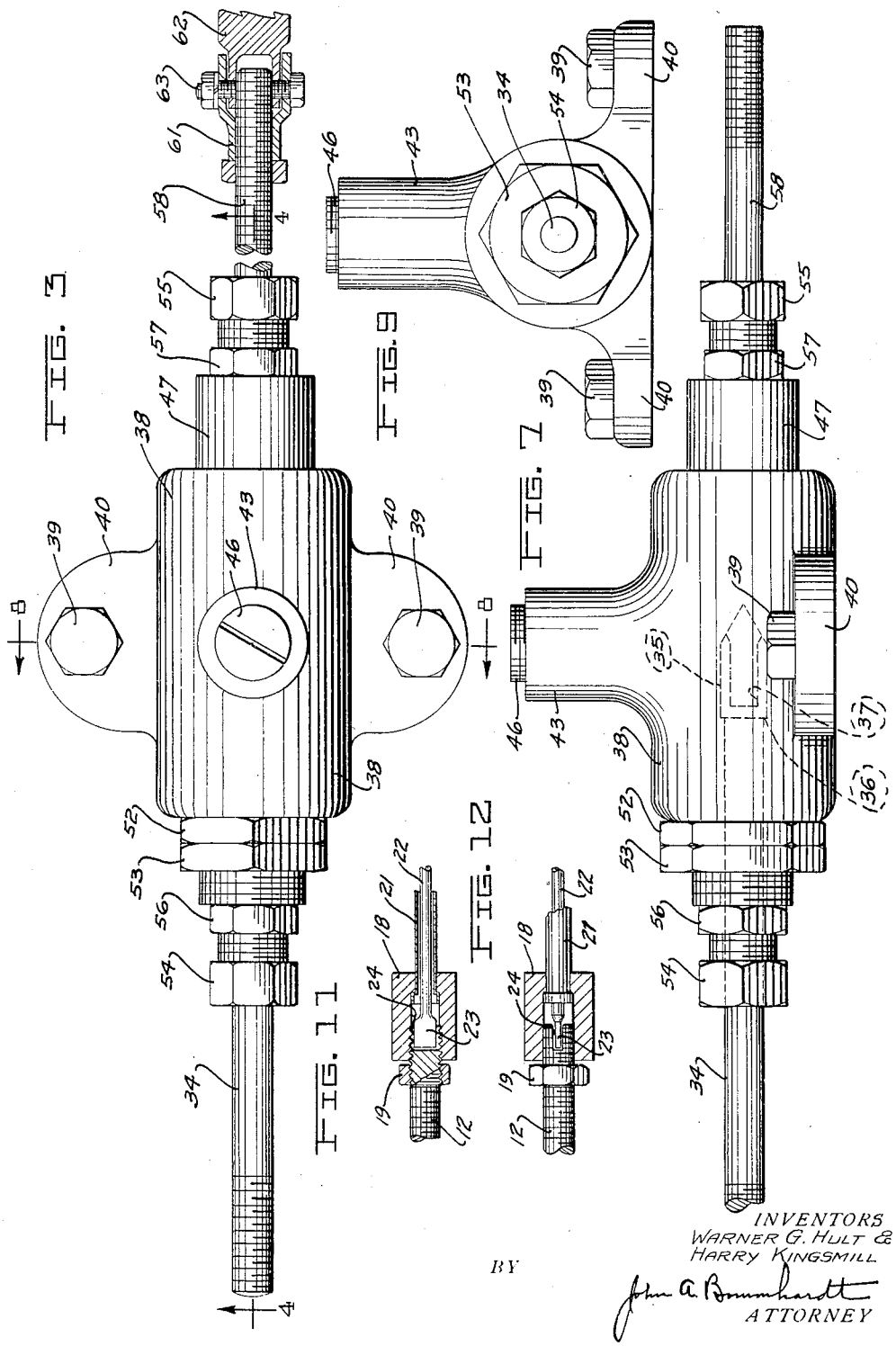

1,890,153

UNITED STATES PATENT OFFICE

WARNER G. HULT AND HARRY KINGSMILL, OF CLEVELAND, OHIO

CLUTCH BRAKE CONTROL DEVICE FOR MOTOR VEHICLES

Application filed December 26, 1931. Serial No. 583,310.

This invention has for its objects a simple and effective means for manipulating the clutch and brakes of an automobile simultaneously with one foot movement.

Another object is to provide a positive lock for the brakes when parking.

Other objects may readily be noted from the following specification and accompanying illustrations, and in which:—

Fig. 1 is a side view of the invention in operating position.

Fig. 2 is a similar view with the clutch pedal depressed.

Fig. 3 is a top plan view of part of the device.

Fig. 4 is a longitudinal section taken on lines 4—4 of Fig. 3 showing the brakes released.

Fig. 5 is a section similar to Fig. 4 but with clutch depressed, and brakes locked.

Fig. 6 is a similar section with brakes locked.

Fig. 7 is a side elevation of parts shown in Fig. 3.

Fig. 8 is a transverse section taken on line 8—8 of Fig. 3.

Fig. 9 is an end view of the device.

Fig. 10 is a longitudinal section taken on line 10—10 of Fig. 5.

Fig. 11 is a section of the locking device.

Fig. 12 is a section similar to Fig. 11 but with the key turned in locking position.

Referring to the drawings, the instrument panel of an automobile is indicated by the numeral 9. Lock manipulating knob 10 with stop lever 11 is mounted on stem 12 forward from the face of the instrument panel 9, and works through a bushing 13 which is mounted through the panel with a nut 14 and knob stop pins 15 on the bushing at the front of the instrument panel 9 between the lock manipulating knob 10 and said panel 9, and a nut 16 on the bushing at the back of the instrument panel. Anchored to the nut 16 is one end of a spring 17, which is coiled around the stem 12 and anchored at its other end between an elongated nut 18, into which one end of the stem 12 is screwed, and the lock nut 19.

A stop nut 20 screwed on the stem 12 adjacent the nut 16, and lock nut 19 screwed on the stem 12 adjacent the elongated nut 18 prevents the stem 12 from being drawn forward and holds the spring 17 in place.

Within the elongated nut 18 is mounted a flexible cable 21 through which operates a shaft 22, said shaft being flattened to form a key 23 which may be engaged within the slot 24 in the end of stem 12.

The flexible cable 21 and shaft 22 are mounted through a button 25 in the dash 26 and attached to a second elongated nut 18a in the same manner as hereintofore described for elongated nut 18, being connected to a rod 27 which is slotted at the end in a manner similar to the stem 12.

Rod 27 extends through a brake rod carrier 28 attached to the clutch pedal 29 by a pivot pin 30, said rod 27 having adjusting nuts 31 and 32 respectively to confine it to the carrier.

Rod 27 is screwed into one end of a universal joint or connection 33, and a release pin 34 is screwed into the other end of the universal joint 33. The release pin head 35 shoulders out at 36 and is pointed at the end, with a notch or slot 37 in one side of said head.

A cylinder body 38 is attached by bolts 39 through lugs 40, to a bracket 41 bolted to the under side of floor 42. A neck 43 projects upward from said cylinder body and in which is mounted a ball bearing safety lock 44 with a lock pin 44a, a compression spring 45, and an adjusting screw 46, the spring 45 being mounted between the screw 46 and the ball bearing safety lock 44.

Mounted through the cylinder body 38 is a tubular lock slide 47 with a threaded neck 48, and having an elongated slot 49 with a circular recess or notch 50 overlapping one end of the said slot, to form a kind of key hole slot as shown by Fig. 10.

The lock pin 44a moves within the elongated slot 49, with the movement of the clutch pedal 29, until it reaches the recess 50 into which the lock 44 drops and rests within the notch while the lock pin 44a projects through the elongated slot 49 and into the chamber 51 below.

An adjusting stop nut 52 and lock nut 53 are screwed on the threaded neck 48 of the tubular lock slide 47; and adjustment sleeves 54 and 55 are screwed into the ends of the tubular lock slide 47 and held in position by lock nuts 56 and 57.

A brake rod stud 58 is mounted within the tubular lock slide 47, through the adjustment sleeve 55, the shoulder 59 resting against the inner end of the adjustment sleeve 55, and forms a head 60 which is located within the tubular lock slide 47 and opposite the head 35 of the release pin 34.

In Fig. 6 the device is shown in a locked position with the brakes applied for parking purposes. They are locked by depressing the clutch pedal and turning knob 10 a half turn against tension of coil spring 17. Groove 37 is then at the top and clears pin 44a while clutch pedal is coming back to engaged position and safety lock 44 remains in lock recess 50. They are unlocked by depressing the clutch pedal 29, the release pin 34 is then drawn forward and freed from pin 44a. The spring 17 will automatically turn the lock manipulating knob 10 until the stop arm 11 contacts with the bottom stop pin 15, this turns the shaft 22 within the flexible cable 21 by means of the key 23, in the stud 12, which in sequence turns a similar key in shaft 27, causing the universal 33 and the release pin 34 to turn until the head 35 is reversed and the slot 37 is at the bottom.

When the clutch is re-engaged the tapered head of the release pin 35 will contact with guide pin 44a and force lock 44 out of recess 50. The sliding unit consisting of the tubular lock slide and its contained parts are drawn backward by the tension of the brake springs into a neutral position as shown in Figs. 1 and 4, in which position pin 44a rests upon the top surface of the release pin head 35, compressing the spring 45.

Thus by depressing the clutch pedal 29 the clutch is thrown out and the brakes are applied in one motion, when so desired. While for parking the clutch pedal 29 being depressed the knob is turned back and the lock pin 44, 44a drops into the notch 50 of the elongated orifice 49, locking the brakes. The brakes are then held locked until clutch is again depressed, knob 10 automatically revolves and release pin head 35 is again in position as shown in Fig. 8. The lock 44 is lifted out of recess 50 as previously described.

To complete the mechanical movement in stopping, compress the clutch pedal 29, thus drawing the unit forward in the cylinder body 38, the shoulder 36 of the release pin head 34, pressing against the end of the clutch adjusting sleeve 54, while the shoulder 59 of the brake rod stud head 60 is drawn against the end of the brake adjusting sleeve 55 thus drawing forward the brake rod stud 58 to which the brake equalizing rods are attached by means of a split Y bolt 61 twined upon the said brake rod stud 58 and bolted to the connecting link 62 by bolts 63.

The space between the shoulder 36, of release pin 35, and the inner end of the adjustment sleeve 54 is for the purpose of providing free movement of release pin 34 while depressing the clutch pedal in coasting or shifting gears. The brakes are not applied until shoulder 36 contacts with the inner end of adjustment sleeve 54.

It will be understood that an automobile, or any vehicle that is propelled by a gasoline or combustionable motor, is equipped with a clutch and a pedal. When depressing the pedal the motor is disconnected from the gear shift and drive shaft while shifting gears or bringing the car to a stop. The vehicle is also provided with a set of service brakes and emergency brakes. The service brakes are controlled by a foot pedal. In stopping the vehicle the clutch is disengaged by depressing the pedal. The brakes are applied by depressing the brake pedal. When stopping the car on ascending grades, gravity will roll the car backward unless the foot brake or emergency brakes are held down while engaging the clutch. Now that both feet are occupied on the clutch and brake pedals, it is necessary to accelerate the engine by the hand throttle or holding the emergency brake lever with the right hand, and to accelerate it by the foot. This manipulation must be done in perfect time and smoothness, or the car will slip backward. It might also jerk forward, which will cause undue wear and tear on the gears and associated parts. Severe accidents are known to have been caused by this.

The same conditions are present on descending grades. In parking a car, especially on ascending or descending grades, the emergency brake is applied by pulling the hand lever. At present the foot brakes are not used for parking purposes. However, if the foot brake was held on together with the emergency brake there would be greater safety in parking on grades.

The principal result of our invention is to provide a mechanism to combine the service brakes directly with the clutch. The brakes in general driving can be controlled by operating the clutch pedal by the left foot, liberating the right foot for acceleration. This device is provided with all necessary adjustments. The action of the clutch and the brake will function perfectly. In pressing down the clutch pedal half way to the floor board, the clutch is disengaged. From this point and down to the lower limit the clutch pedal will pull the brakes into applied or set position. The pin 44 will then slide into recess 50 and hold the brakes locked until the clutch pedal comes back to the top position. The clutch is then engaged. At this point the brakes are automatically and instantly released, thus preventing the car from rolling backward or forward. For parking this device is so arranged as to hold the service brakes locked. In pressing down the clutch pedal to the lower limit, the lock pin will slide into recess 50. The brakes are now locked, and while the clutch pedal is held down the knob located on the dash board is turned a half turn or until it stops. From this knob leads the flexible shaft which is connected to the release pin which is also turned a half turn. This side of the release pin has the lengthwise groove 37 in it. While being pushed towards the lock pin by the clutch pedal, as the clutch is engaged, the lock pin will not be pushed out of the recess. In the lock slide the small diameter of the lock pin is now protruding into the groove of the release pin. This release pin cannot be turned until the clutch pedal is again depressed.

In depressing the clutch pedal half way down, the release pin is pulled forward with it and away from the lock pin. The coil spring attached on the shaft leading to the knob on the dash board will automatically revolve the release pin back a half turn. Thus the release pin will always be in a working position and it will push the lock pin out of the recess in the lock slide. This will also release the brakes when the clutch again engages.

With this device the service brakes are directly operated by the clutch pedal. The present standard service brake pedals will be used so that the brakes can be applied with the right foot, when the car is in gear and the clutch is engaged. This is required for good control on slippery roads.

This device can also be used in connection with the emergency brake. If one chooses the emergency brake would be operated by the clutch pedal. The emergency will be held locked while stopping and shifting the gears, on ascending or descending grades. It will be automatically released while engaging the clutch thus preventing the car from moving backward or forward. When parking, the knob on the dash board will be turned a half turn, while depressing the clutch pedal. It is then locked until the clutch pedal is again released. This eliminates the present standard hand lever and ratchet lock on the emergency brake. They are considered obstructive and this will also afford more room in the car.

We claim:

1. A connection between the clutch lever and brake rod of an automobile, comprising a slide, lost motion connections between the slide and the lever and the rod, and means to lock the slide against movement when the lever is depressed and the brakes are applied.

2. The connection stated in claim 1, and means to manually release the lock when the brakes are to be released.

3. The connection stated in claim 1, and means to release the lock, said means including a turning and reciprocating rod forming part of the connection between the slide and the lever.

4. The connection stated in claim 1, and means to release the lock, said means including a turning and reciprocating rod and a flexible shaft connected to said rod.

5. The combination with the clutch lever and brake rod of an automobile, of a fixed casing provided with a spring locking pin, a tubular slide in the casing, having a slot and lock notch into which the pin projects, to lock the slide against movement when the pin engages the notch, connections between the slide and the lever and rod, and means extending within the slide to force the pin out of the notch and release the slide.

6. The combination stated in claim 5, said means including a rod forming part of the connection between the slide and the lever, and a beveled head on the rod, engageable with the pin, within the slide.

7. The combination stated in claim 5, said means including a turning rod forming part of the connection between the slide and the lever and having a beveled head in the slide, and a flexible shaft connected to the rod to turn the same.

8. The combination stated in claim 5, said means including a reciprocating and turning rod operatively connected to the lever and having a head slidable in the guide, said head having a beveled surface on one side engageable with the pin to release the same when turned to one position, and a recess on the other side to avoid such release when turned to the other position.

9. The combination with a brake rod and a clutch lever, of a fixed guide casing, a tubular slide in said casing, connected to said rod, and having a slot with a lock notch at one end thereof, a spring locking pin mounted in the casing and projecting into said slot and adapted to prevent movement of the slide when engaged in the notch, and a rod operatively connected to the lever and having a head slidable to a limited extent within the guide, the head having a beveled end engageable with the pin to release the same from the notch when the clutch lever is in released position.

10. The combination stated in claim 9, the rod connected to the lever being manually adjustable to avoid engagement of said beveled end with said pin.

11. The combination stated in claim 9, the head having a groove on the side opposite to the bevel, and a rod being manually settable to register said groove with the pin and prevent such release.

In testimony whereof, we do affix our signatures.

WARNER G. HULT.
HARRY KINGSMILL.